(12) United States Patent
Dickens

(10) Patent No.: US 6,654,905 B1
(45) Date of Patent: Nov. 25, 2003

(54) METHOD AND APPARATUS FOR DETECTING A FAULT CONDITION IN A COMPUTER PROCESSOR

(75) Inventor: Francis B Dickens, Birmingham (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/552,257

(22) Filed: Apr. 19, 2000

(30) Foreign Application Priority Data

May 22, 1999 (GB) .............................................. 9911890

(51) Int. Cl.[7] .............................................. G01R 31/28
(52) U.S. Cl. .............................. 714/10; 714/30; 714/31; 714/36; 714/736; 714/733
(58) Field of Search .............................. 714/10, 30, 31, 714/36, 733, 735, 336

(56) References Cited

U.S. PATENT DOCUMENTS

| | | | |
|---|---|---|---|
| 4,493,078 A | 1/1985 | Daniels | 371/25 |
| 4,729,124 A * | 3/1988 | Hansel et al. | 714/31 |
| 4,922,418 A * | 5/1990 | Dolecek | 714/51 |
| 5,073,853 A | 12/1991 | Johnson | |
| 5,257,373 A | 10/1993 | Kurihara et al. | |
| 5,661,732 A * | 8/1997 | Lo et al. | 714/725 |
| 5,758,060 A | 5/1998 | Little et al. | |
| 6,128,687 A * | 10/2000 | Dao et al. | 710/305 |
| 6,189,114 B1 * | 2/2001 | Orr | 714/25 |
| 6,327,685 B1 * | 12/2001 | Koprowski et al. | 714/733 |
| 6,393,590 B1 * | 5/2002 | Wood et al. | 714/55 |
| 6,408,410 B1 * | 6/2002 | Needham | 714/724 |

* cited by examiner

Primary Examiner—Scott Baderman
Assistant Examiner—Anne L. Damiano
(74) Attorney, Agent, or Firm—Andrus, Sceales, Starke & Sawall

(57) ABSTRACT

A method for detecting a fault condition in a computer processor operating a main control program, comprising the steps of sequentially performing a plurality of functions on an initial input value so as to compute a final value, the input value to each of the second and subsequent functions being provided by the output value from the preceding function in the sequence; loading at least one self-test module onto the computer processor for detecting whether a fault condition has occurred in the computer processor, wherein at least one of the functions is carried out within a self-test module; and comparing the computed final value with a predetermined value to provide an indication of whether a fault condition has occurred in the computer processor. The invention also relates to an apparatus for detecting a fault condition in a computer processor.

12 Claims, 2 Drawing Sheets

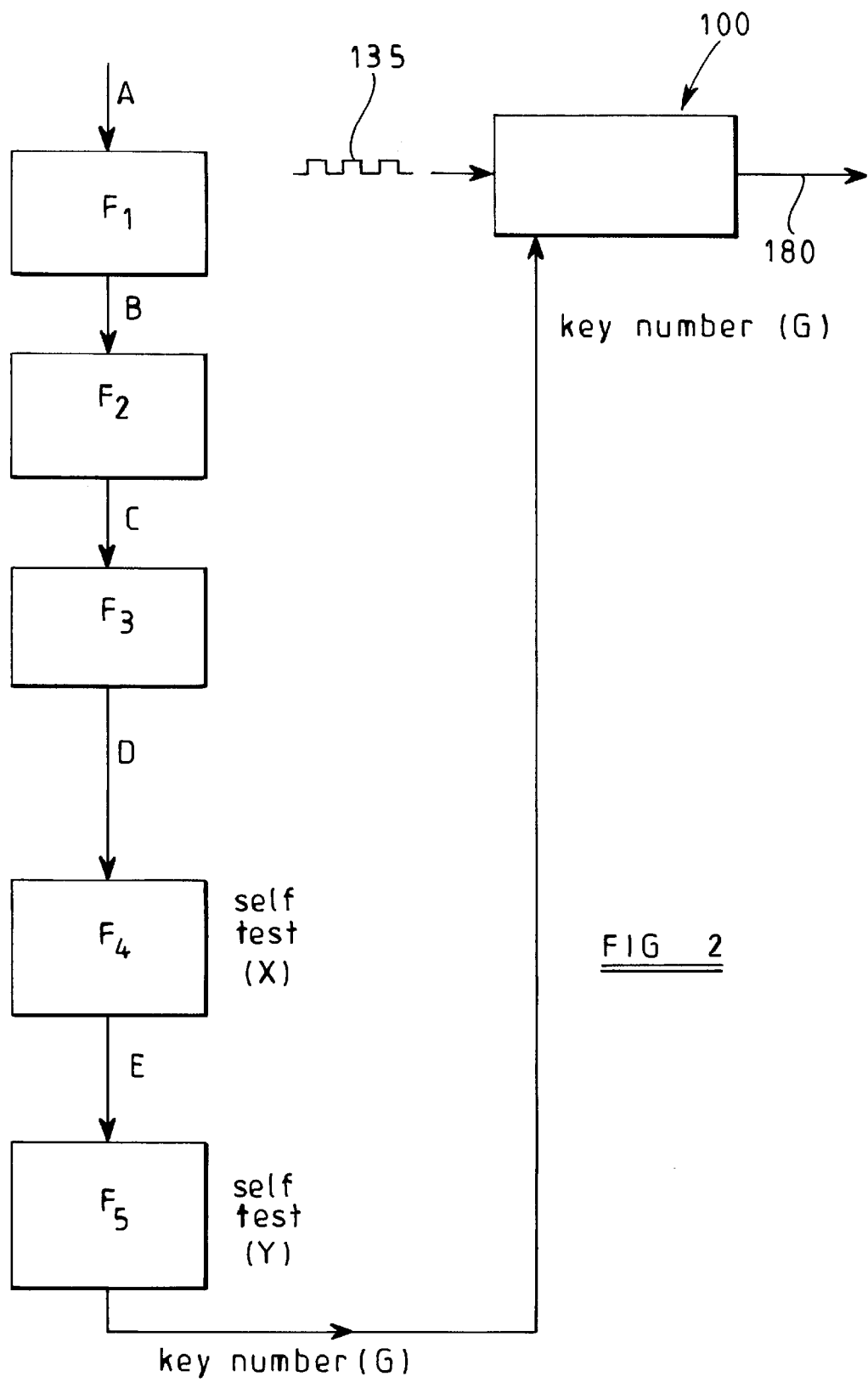

METHOD AND APPARATUS FOR DETECTING A FAULT CONDITION IN A COMPUTER PROCESSOR

Figure 1:
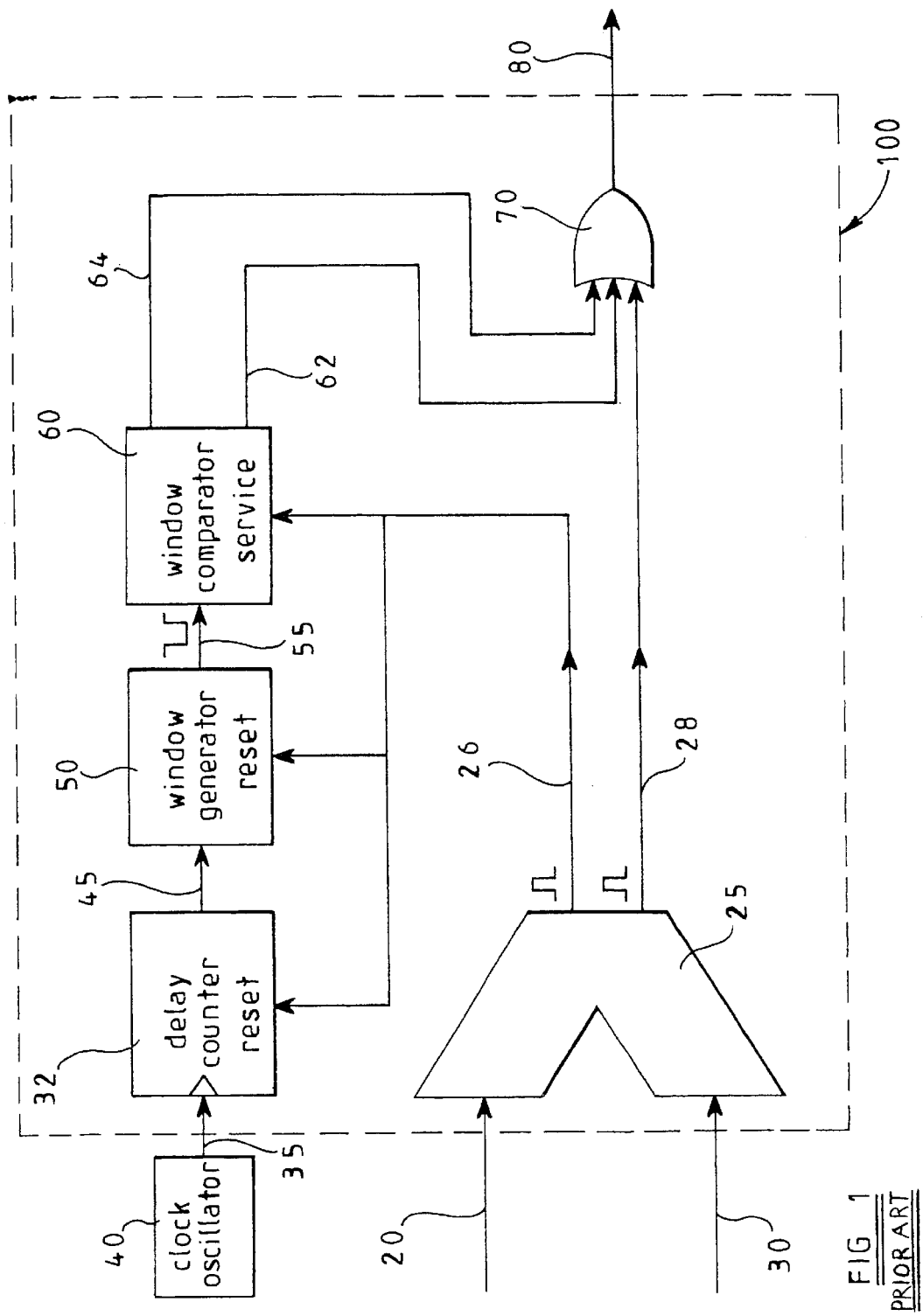

The invention relates to a method and apparatus for detecting a fault condition in a computer processor.

In computer operated systems, it is desirable to be able to detect when a fault or malfunction has occurred in the computer processor. In particular, the detection of a fault is vitally important in safety-critical computer processor applications, such as in aircraft computer systems. A known method for detecting a fault or malfunction in a computer processor utilises a timer counter, commonly referred to as a "watchdog timer". The timer counter receives a clocked input pulse of predetermined frequency and the count of the timer counter is incremented each time a pulse of the clocked input is applied. In the event that the count reaches a pre-set maximum count, the timer counter generates an output pulse.

The computer processor is programmed with a self-test module which checks whether the computer processor is performing correctly. Periodically, a signal derived from the self-test module is supplied by the processor to the reset input on the timer counter to reset the counter. Providing the computer processor is functioning correctly, the timer counter does not therefore reach the pre-set maximum count and does not provide an output. If a fault occurs in the computer processor, the reset signal is not provided to the timer counter and, on reaching the predetermined count, the timer counter generates an output pulse, the generation of the output pulse thus signifying that a fault has occurred in the computer processor.

A disadvantage of this fault detection method is that when a fault occurs in the computer processor the signal provided by the processor to the timer counter may become "stuck" so that the reset signal is continuously supplied to the timer counter. Thus, even though a fault may have occurred in the computer processor, an output will not be provided by the timer counter to indicate that there is a fault.

A more sophisticated type of watchdog timer is described in U.S. Pat. No. 5,073,853. Using this method, the computer runs a self-test module and the signal supplied by the self-test module alternates between two values. Each value is derived from the preceding value by a calculation performed by the computer processor. The alternating signal is supplied to an input of a comparator which provides a reset signal to the watchdog timer only if the correct sequence of values is received at the comparator input. Using this method the correct sequence of reset signals cannot be produced if the computer processor has failed. In addition, the watchdog timer described in U.S. Pat. No. 5,073,853 includes a "window timer", arranged such that the watchdog timer responds to the reset signal only if the signal is received within a predetermined time window. Any signals received outside the predetermined time window are regarded as faults and a fault output is generated.

Another known method for detecting a computer fault is described in U.S. Pat. No. 5,257,373 in which a control program is loaded onto the processor and performs a number of separate functions on an input value. After each function of the control program has been completed, a software check is made to determine whether the function was executed correctly and, if so, a counter associated with that function is incremented accordingly. At the end of the sequence, the count in each counter is checked in software and only in the event that all the counters have incremented correctly will a reset signal be provided to a watchdog timer.

A disadvantage of this method is that the final checking step in the procedure (i.e. the checking of the counter contents) is performed in software and thus is itself vulnerable to computer failure. In addition, the counter contents are not cleared during computer processing so that the control program may become "stuck", thereby causing an erroneous reset signal to be provided to the timer counter even in the event of a fault.

It is an object of the present invention to provide a method for detecting a fault condition in a computer processor which has an improved fault detection capability.

According to the present invention there is provided a method for detecting a fault condition in a computer processor, comprising the steps of:

sequentially performing a plurality of functions on an initial input value so as to compute a final value, the input value to each of the second and subsequent functions being provided by the output value from the preceding function in the sequence;

loading at least one self-test module onto the computer processor for detecting whether a fault condition has occurred in the computer processor, wherein at least one of the functions is carried out within a self-test module; and comparing the computed final value with a predetermined value to provide an indication of whether a fault condition has occurred in the computer processor.

Each of the functions must be performed, and in the correct sequence, for a correspondence to be obtained. Thus, the method has an improved fault condition detection capability. By distributing the functions throughout the control program the method can be used to check whether the various steps of the program are being performed in their correct sequence. Furthermore, by performing at least one of the functions within a self-test module, a check is made on the functioning of the self-test module itself.

The computed final value may be made up of two secondary computed values, a correspondence being obtained when the secondary computed values are generated in a required sequence.

Conveniently, the self-test modules are provided within the main control program operated by the computer.

The method preferably includes the further steps of:

generating a service pulse if the computed final value is equivalent to the predetermined value;

generating a time window;

detecting whether the service pulse is received within the time window; and generating a fault condition output if the service pulse is received outside of the time window.

Thus, a fault can be detected even if the computed final value becomes "stuck" at the correct value, as the subsequent service pulse must be received within the time window for a valid service to be registered. If the service pulse is received before the time window has been started, or after expiry thereof, a fault condition output is generated to indicate that a fault has occurred in the computer processor.

Alternatively, the method may include the further steps of:

incrementing a count of counter means, the counter means providing a fault condition output in the event that a pre-set count is reached and;

changing the count of the counter means in response to a correspondence between the computed final value and the predetermined value, such that, in the event that no such correspondence occurs, the counter means provides a fault condition output, thereby indicating that a fault condition has occurred in the computer processor. The count is preferably reset to a zero count in response to a correspondence between the computed final value and the predetermined value.

According to another aspect of the invention, there is provided an apparatus for detecting a fault condition in a computer processor comprising:

means for sequentially performing a plurality of functions on an input value so as to compute a final value, the input value to each of the second and subsequent functions being provided by the output value from the preceding function in the sequence; and at least one self-test module, loaded onto the computer processor, for detecting whether a fault condition has occurred in the computer processor, wherein at least one of the functions is carried out within a self-test module, and means for comparing the computed final value with a predetermined value to provide an indication of whether a fault condition has occurred in the computer processor.

The apparatus preferably includes means for generating a service pulse if the computed final value is equivalent to the predetermined value, means for generating a time window, and means for detecting whether the service pulse is received within the time window, whereby receipt of the service outside the time window results in generation of a fault condition output.

For the purpose of this specification, the occurrence of a fault or functional error in a computer processor shall be referred to as a "fault condition".

In the accompanying drawings:

FIG. 1 is a schematic diagram of a conventional watchdog timer for use in a method of detecting a fault condition in a computer processor; and FIG. 2 is a flow diagram to illustrate the method of the present invention.

With reference to FIG. 1, a computer processor (not shown) is programmed with software for performing a particular operation such as, for example, controlling hardware. Conventionally, in order to check whether the computer processor is operating correctly, the computer periodically runs a self-test module which provides an output signal 20 each time the self-test module is executed correctly. The output signal 20 is supplied to a watchdog timer to determine whether the computer processor is operating correctly, as will now be described.

In the watchdog timer, the output signal 20 is supplied to a comparator 25 where it is compared with a predetermined key number 30 input to the comparator 25. If the output signal 20 is equal to the key number 30, the comparator 25 generates a first output pulse 26, referred to as a service pulse, and if the output signal 20 is not equal to the key number 30, the comparator 25 generates a second output pulse 28. If a second output pulse 28 is generated, this is supplied to an OR gate 70 which outputs a fault detection pulse 80 to indicate that a fault has occurred.

The watchdog timer also includes a counter 32, referred to as a delay counter, which receives a clocked input pulse 35 from a clock oscillator 40 operating at a predetermined frequency. The clocked input pulse 35 increments the count stored in the delay counter 32 each time an input pulse is received. After a predetermined count has been reached, the delay counter 32 provides an output signal 45 to trigger a window generator 50 which, on receipt of the signal 45, generates a time window 55 which is supplied to a window comparator 60.

The window comparator 60 also receives the service pulse 26 if the correct output signal 20 has been supplied by the self-test module. If a subsequent service pulse 26 arrives at the window comparator 60 outside the time window 55, generated by the window generator 50 on receipt of the preceding service pulse, the window comparator 60 outputs a first output pulse 62 to the OR gate 70. In addition, if the time window 55 generated by the window generator 50 expires before the window generator 60 has received the subsequent service pulse 26 from the comparator 25, the window comparator 60 generates a second output pulse 64 which is also provided to the OR gate 70. If the OR gate 70 receives a second output pulse 28 from the comparator to indicate that an incorrect output signal 20 has been received, or an output pulse 62 from the window generator 60 to indicate that the subsequent service pulse was not received within the time window 55, or an output pulse 64 from the window generator 60 to indicate that the time window 55 expired before the subsequent service pulse was received, a fault output signal 80 is generated to indicate that a fault has occurred in the computer processor.

The output pulse 26 generated by the comparator 25 in response to a "correct" output signal 20 is also supplied to the delay counter 32 and the window generator 50 to reset these counters ready for the next output signal 20.

Referring to FIG. 2, there is shown a flow diagram to illustrate the method of the present invention which has an improved fault detection capability. The method may be implemented using the watchdog timer 100 of the type generally described with reference to FIG. 1.

A computer processor (not shown) runs a control program for performing a desired operation, such as controlling hardware on an aircraft. The processor is also programmed with two self-test modules, referred to as (X) and (Y), to periodically check the operation of the processor. The self-test modules are distributed at suitable places throughout the control program so that, as the processor performs its usual processing steps, it periodically encounters the self-test modules.

In addition, five routines are distributed throughout the control program to perform functions $F_1$, $F_2$, $F_3$, $F_4$ and $F_5$. The first routine receives an input value A and performs a first function $F_1$, thereby generating a value B. Value B becomes the input value for the second routine which performs function $F_2$ and generates an output value C which forms the input to a third routine which performs function $F_3$ generating a value D. In addition, self-test module X includes a sub-routine to perform function $F_4$ on value D, the output of which (value E) is input to a function $F_5$ within self-test module Y. The final output value, G, generated from function $F_5$, is therefore derived by sequentially performing a number of functions on the original input value A, or "seed number". The output value, G, is referred to as the "key number" and can be expressed mathematically by the following equation:

$$\text{key number} = F_5(F_4(F_3(F_2(F_1(\text{seed number})))))$$

The key number, G, computed in software is then supplied to the watchdog timer 100, where it is compared with a predetermined value i.e. the key number, G, takes the place of the input signal 20 shown in FIG. 1. As described previously, the watchdog timer 100 includes a delay counter, driven by a clocked input pulse 135, the watchdog timer generating a fault output signal 180 in the event of an incorrect key number being calculated, or in the event that the window comparator is serviced with a service pulse outside the time window, or in the event that the time window expires before a service pulse is received.

With reference to FIG. 2, only if all of the functions $F_1$–$F_5$ have been executed in sequence, and in the correct sequence, will the computed key number be equal to the predetermined key number required by the watchdog timer 100 for a valid service. Thus, if any one of the functions $F_1$–$F_5$ is not implemented, or if the functions are not implemented in the correct order, the key number computed in software will not match the key number required for a valid service, and a fault condition output signal 180 will be generated to provide an indication that a fault has occurred in the computer processor.

Furthermore, as the window comparator generates an output pulse in the event of either a service pulse being received after expiry of the time window, or in the event that the time window expires before a service pulse is received, it is possible to identify fault conditions arising from both premature and delayed service pulses.

Each time the key number is written to the watchdog timer 100, the key number is immediately overwritten in software and a new key number is computed for the next servicing of the counter. The immediate overwriting of the key number in this way does provide the remote possibility that a fault which occurs due to the overwrite step being skipped can go undetected. This problem can be overcome in several ways. For example, the method can be adapted such that two key numbers must be written consecutively and in the correct order in order to achieve a valid service. The same memory location is used for both key number write operations, such that writing the second number to the memory location ensures the first key number no longer resides in that location.

Alternatively, the problem of skipped overwrite can be overcome by arranging for the key number required for a valid service to alternate cyclically between two different values. Thus, the predetermined input 30 to the comparator 25 must be varied cyclically between two different values. In this case it is necessary to compute two key numbers alternately throughout the control program, each being calculated by a series of sequential functions, as described hereinbefore for a single key number, and with both key numbers being written to one memory location. Once again, the writing of the second key number ensures that the first number no longer resides in the memory location. However, this latter solution has an increased complexity over the former solution, as it is necessary to keep synchronisation between the key numbers calculated by the software and the key numbers required by the counter.

The software code required to perform the functions $F_1$–$F_5$ may be distributed throughout the control program on a time distribution basis so that the counter is serviced with the calculated key number at approximately regular time intervals. Alternatively, the software code required to perform the functions $F_1$–$F_5$ may be located in the control program in close proximity with the most critical software modules of the main control program. In a further alternative embodiment the software code for performing the functions may form an integral part of the most critical software modules.

In the example illustrated in FIG. 2, five functions, $F_1$–$F_5$, are utilised in the sequence for computing the key number, two of which are implemented within the self-test modules X and Y. However, it will be appreciated that any number of functions, $F_1$–$F_n$, and any number of self-test modules may be employed. By utilising one or more self-test module, the method provides the advantage of a two-fold fault condition check, the or each self-test module itself providing a means of detecting whether a fault condition has occurred in addition to the key number calculation. It will also be appreciated that increasing the number of function stages in the key number calculation increases the reliability of the method in detecting the occurrence of a fault in the processor.

Although it is not necessary for the self-test modules to be distributed throughout the control program loaded onto the processor, it is important that the self-test modules are intimately involved in a part of the calculation of the key number by including at least one of the functions, $F_1$–$F_n$, used to calculate the key number within a self-test module. In this way, a check is made on the functioning of the self-test module itself.

It will be appreciated that the comparator 25 may be replaced with any suitable comparative circuitry for comparing the key number, G, received at one input, with a predetermined value. The predetermined value need not be the expected value of the key number, but may be any predetermined value, the difference between the key number, G, and the predetermined value being used to determined whether service pulse 26 or output pulse 28 is generated. Additionally, the OR gate 70 shown in FIG. 1 may be replaced by logic circuitry which is implemented in software.

It will be appreciated that the method of the present invention may be implemented in combination with a watchdog timer of a type other than that described with reference to FIG. 1. For example, a more simplified watchdog timer may be employed in which a counter, receiving a continuous clocked input pulse, provides a fault condition output in the event that a pre-determined maximum count is reached. If a correct key number is received at the comparator, an output signal from the comparator is supplied to the counter to reset the count. Thus, in the event that an incorrect key number is calculated, no reset signal is received by the counter, the predetermined maximum count is reached and a fault condition output is generated.

I claim:

1. A method for detecting a fault condition in a computer processor operating a main control program, comprising the steps of:

sequentially performing a plurality of functions on an initial input value so as to compute a final value, the input value to each of the second and subsequent functions being provided by the output value from the preceding function in the sequence;

loading at least one self-test module onto the computer processor for detecting whether a fault condition has occurred in the computer processor, wherein at least one of the functions is carried out within a self-test module; and comparing the computed final value with a predetermined value to provide an indication of whether a fault condition has occurred in the computer processor.

2. The method as claimed in claim 1, wherein the computed final value comprises two secondary computed values, a correspondence being obtained when the secondary computed values are generated in a required sequence.

3. The method as claimed in claim 1, wherein the self-test modules are provided within the main control program operated by the computer.

4. The method as claimed in claim 1, the method comprising the step of performing the plurality of functions in software using code distributed throughout the main control program on a time distribution basis such that the computed final value is calculated at substantially regular intervals.

5. The method as claimed in claim 1, the method comprising the steps of performing the plurality of functions in software using code distributed throughout the main control program in close proximity with a critical software module.

6. The method as claimed in claim 1, the method comprising the step of performing the plurality of functions in software using code forming an integral part of a critical software module.

7. The method as claimed in claim 1, further comprising the steps of:
   generating a service pulse if the computed final value is equivalent to the predetermined value;
   generating a time window;
   detecting whether the service pulse is received within the time window; and
   generating a fault condition output if the service pulse is received outside of the time window.

8. The method as claimed in claim 7, further comprising the step of generating a fault condition output in the event that the service pulse is received before the time window has been started, or after the time window has expired.

9. The method as claimed in claim 7, further comprising the step of incrementing a count of a counter, the counter providing a fault condition output in the event that a pre-set count is reached and;
   changing the count of the counter in response to a correspondence between the computed final value and the predetermined value, such that, in the event that no such correspondence occurs, the counter provides a fault condition output, thereby indicating that a fault condition has occurred in the computer processor.

10. The method as claimed in claim 9, wherein the counter is reset to a zero count in response to a correspondence between the computed final value and the predetermined value.

11. An apparatus for detecting a fault condition in a computer processor operating a main control program comprising:
   software code for sequentially performing a plurality of functions on an input value so as to compute a final value, the input value to each of the second and subsequent functions being provided by the output value from the preceding function in the sequence; and
   at least one self-test module, loaded onto the computer processor, for detecting whether a fault condition has occurred in the computer processor, wherein at least one of the functions is carried out within a self-test module, and
   a comparator for comparing the computed final value with a predetermined value to provide an indication of whether a fault condition has occurred in the computer processor.

12. The apparatus as claimed in claim 11, further comprising;
   a device for generating a service pulse if the computed final value is equivalent to the predetermined value,
   a device for generating a time window, and
   a device for detecting whether the service pulse is received within the time window, whereby receipt of the service pulse outside the time window results in generation of a fault condition output.

* * * * *